United States Patent [19]

Hold et al.

[11] 4,300,842

[45] Nov. 17, 1981

[54] SEALS FOR ROTARY PROCESSOR

[75] Inventors: Peter Hold, Milford, Conn.; Zehev Tadmor, Teaneck, N.J.

[73] Assignee: USM Corporation, Farmington, Conn.

[21] Appl. No.: 173,998

[22] Filed: Jul. 31, 1980

Related U.S. Application Data

[63] Continuation of Ser. No. 965,388, Dec. 1, 1978, abandoned.

[51] Int. Cl.³ ............................................. B01F 7/10
[52] U.S. Cl. ..................................... 366/99; 366/315; 415/170 R; 425/381.2
[58] Field of Search ................. 366/52, 69, 96–99, 366/136, 293, 262–265, 315, 302–307, 336, 337, 340; 264/85, 349, 176 C; 425/224, 374, 466, 86, 376, 207, 378, 381.2; 415/90, 101, 170 R, 170 B; 72/60, 262, 270; 277/15, 53, 135

[56] References Cited

U.S. PATENT DOCUMENTS

| | | | |
|---|---|---|---|
| 3,829,270 | 8/1974 | DeBonth et al. | 425/381.2 |
| 4,046,388 | 9/1977 | Meyer | 415/170 R |
| 4,142,805 | 3/1979 | Tadmor | 366/97 |

OTHER PUBLICATIONS

Advances in Dynamic Seal Technology, by Otto Decker; published by A.S.M.E. 3-29-67.

Primary Examiner—Philip R. Coe
Assistant Examiner—Timothy F. Simone
Attorney, Agent, or Firm—John P. Morley

[57] ABSTRACT

Sealing means for controlling leakage of material between closely spaced apart, relatively moving coaxial annular surfaces. Essentially, leakage is controlled by providing a plurality of helical sealing channels on one of the relatively moving surfaces to resist flow of leakage liquid between the surfaces. The sealing means are particularly adaptable for controlling leakage from processing passages of rotary processing apparatus.

20 Claims, 30 Drawing Figures

D... OUTSIDE DIAMETER
L... WIDTH
θ... HELIX ANGLE
W... CHANNEL WIDTH
e... FLIGHT WIDTH
H... CHANNEL DEPTH
δ... CLEARANCE (50)
n... NUMBER OF PARALLEL CHANNELS
V... SURFACE VELOCITY $$L = D\pi \cdot \theta$$
$$W = \frac{D\pi \sin\theta}{n} - e$$

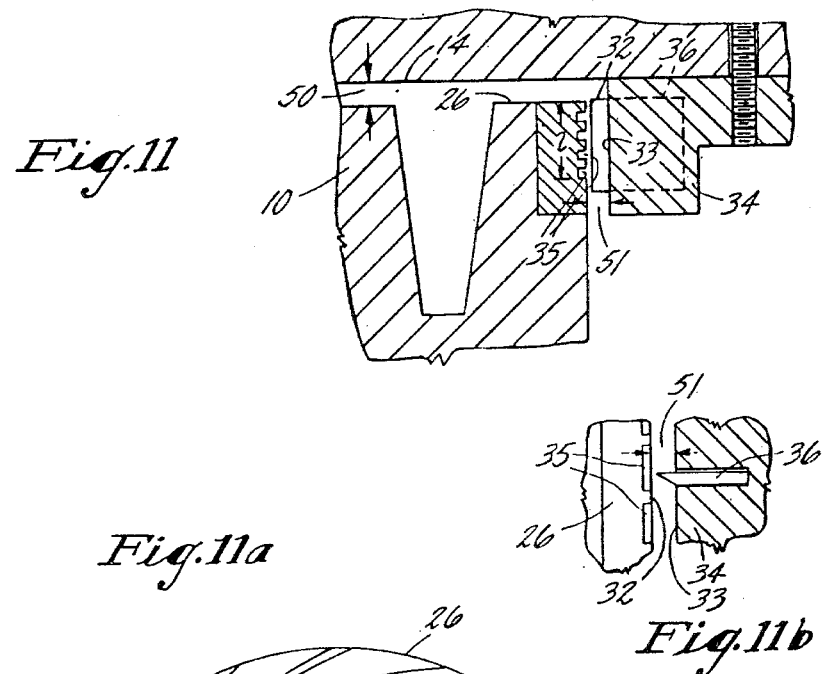
Fig.11
Fig.11b
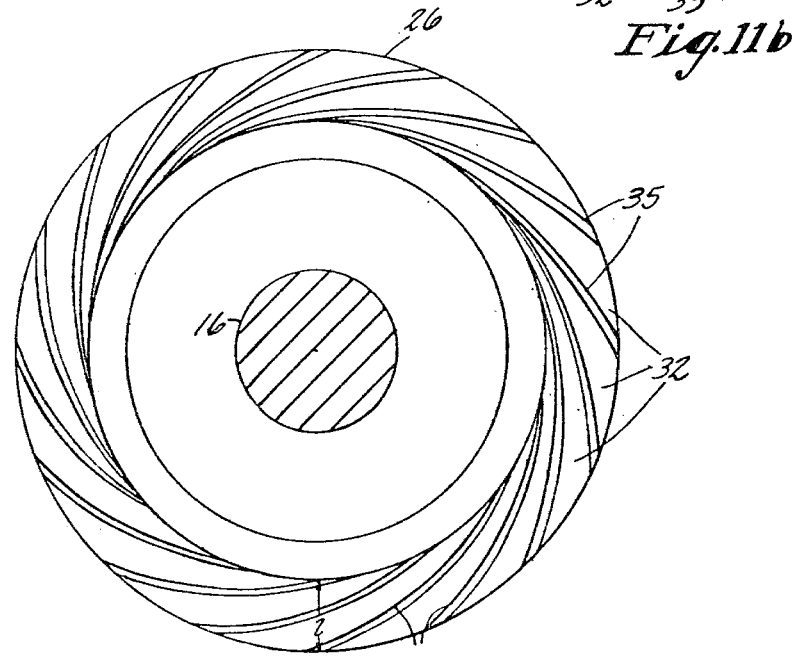
Fig.11a

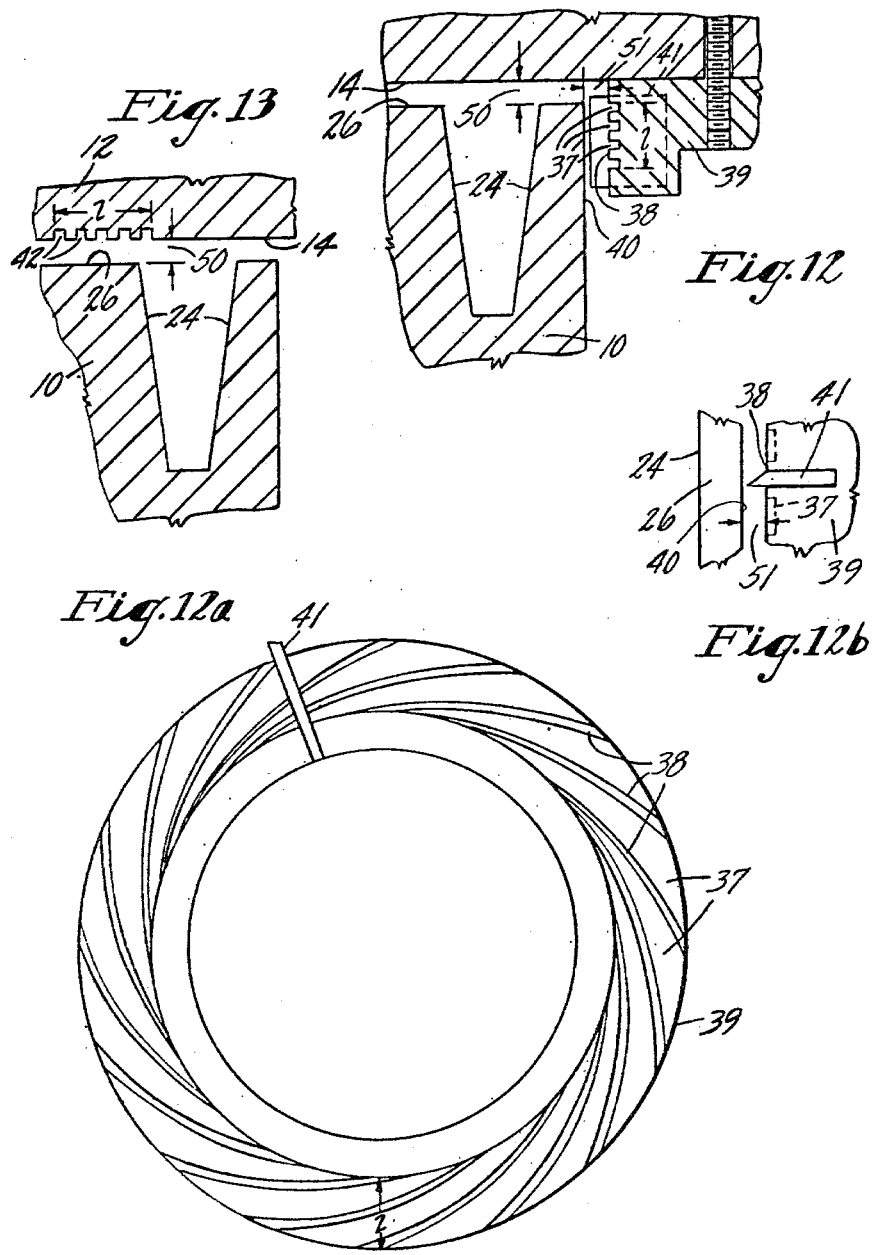

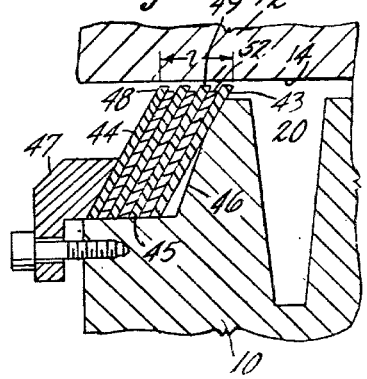
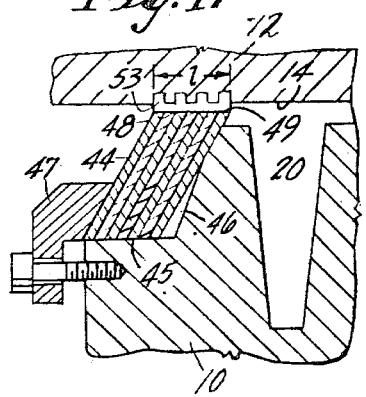
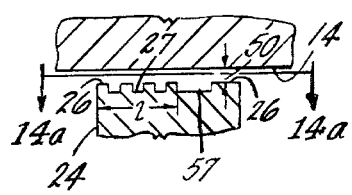
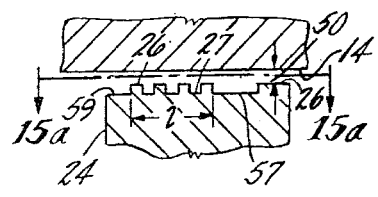
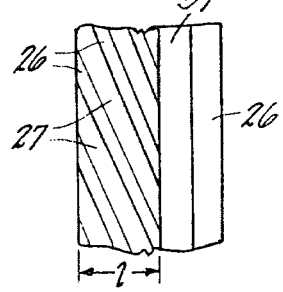
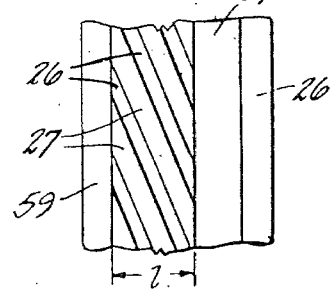

SEALS FOR ROTARY PROCESSOR

This is a continuation, of application Ser. No. 965,388 filed Dec. 1, 1978, abandoned.

THE FIELD OF THE INVENTION

This invention relates to novel, improved sealing means for rotary processors particularly those for processing viscous or particulate plastic or polymeric materials.

DESCRIPTION OF THE PRIOR ART

U.S. Pat. No. 4,142,805 filed May 11, 1977 as a continuation-in-part of U.S. application Ser. No. 654,040 filed Feb. 2, 1976 (now abandoned) and copending U.S. patent application Ser. No. 898,178 filed Apr. 20, 1978 now U.S. Pat. No. 4,194,841 by Zehev Tadmor—one of the inventors of this application—disclose processes and apparatus for processing plastic or polymeric materials. U.S. Pat. No. 4,142,805 and application Ser. No. 898,178 now U.S. Pat. No. 4,194,841 are expressly incorporated here by reference.

The essential elements of the basic, individual, annular processing passage described in those applications comprise a rotatable element carrying at least one annular processing channel and a stationary element providing a coaxial surface cooperative with the channel to form an enclosed processing passage. The stationary element has an inlet to feed material to the passage for processing and an outlet spaced apart from the inlet a major portion of the circumferential distance about the processing passage to discharge processed material from the passage. A member providing a liquid material collecting end wall surface is arranged with the stationary element and located in the passage near the outlet to obstruct or restrain movement of material fed to the passage and to coact with the rotating channel walls to provide relative movement between the material and the internal surfaces of the channel walls rotated toward the outlet. This distinctive coaction permits only liquid material in contact with the internal surfaces of the rotating channel to be dragged forward to the liquid material collecting end wall surface for controlled processing and/or discharge.

In the preferred embodiment of the invention described in U.S. Pat. No. 4,142,805 and application Ser. No. 898,178 now U.S. Pat. No. 4,194,841 the essential elements of the processing apparatus are arranged so that the rotatable channel carrying element is adapted for rotation in a stationary housing or chamber (the stationary element). The described processing channel and preferably a plurality of processing channels are formed in the cylindrical surface of a rotor with each channel having opposing side walls extending inwardly from the rotor surface. The stationary housing or chamber described has an internal, cylindrical surface providing the cooperative coaxial surface which together with the annular processing channel(s) form an enclosed processing passage(s).

The method and apparatus of the Tadmor applications are described as useful for conveying of solids, melting or plasticating plastic or polymeric material; conveying, pumping or pressurizing viscous liquid material; mixing, blending, dispersing and homogenizing material; and devolatilizing and/or bringing about molecular or microscopic or macroscopic structural changes by chemical reactions such as polymerization.

Because of the versatility and adaptability of the basic individual processing passage, a plurality of them are generally employed to provide processors usually with one or more passages performing a different operation or function. For example, one or more of the individual passages could be assigned the function of receiving and transporting material from one passage to another or, one or more individual passages could be assigned the function of melting or mixing or devolatilizing or discharging polymeric or plastomeric material(s). The particular function assigned an individual passage usually determines the pressure characteristics of that passage. For example, some assigned functions such as melting or discharging can imply the generation of very high pressures. Other functions such as devolatilizing can involve the generation of low pressures while mixing operations may involve moderate pressures. Also, the distribution of pressure along the circumference of each passage can vary depending upon the function or operation assigned the passage. For some functions, pressure may increase linearly along the complete circumference or along only a portion of the circumference or, some functions provide pressure characteristics involving one or more pressure rises followed by one or more sharp drops along the circumference. Moreover, oftentimes basic, individual processing passages having particular pressure characteristics—such as high pressure—are positioned or arranged beside or between units having completely different pressure characteristics—such as low pressure.

In most instances it is desirable to provide effective sealing for some or all of the individual basic passages of a multi-passage processor to prevent unwanted leakage of material from at least some of the passages. The unwanted leakage for example can be external leakage from one or both of the end passages of a multi-passage processor. Also, unwanted leakage can occur internally between adjacent individual processing passages. In all instances however, the leakage of particular concern occurs at a clearance required between the peripheral or top surface of the rotatable cylindrical channel wall(s) and the stationary interior coaxial annular surface particularly at those portions of the passage where high pressures are generated.

External and internal leakage problems are particularly complicated in multi-unit rotary processors because of the differential radial pressures usually established along the circumference of the passage(s). For example, generally the pressure at the inlet of a passage is low while the pressure at the member providing the material collecting end wall surface can be extremely high. In fact, the differential in radial pressures can be great enough to cause deflection of the rotor or shaft thereby imposing an undesirable constraint on the tolerances available for the requisite clearance between the top surface of the rotatable cylindrical channel wall(s) and the stationary interior coaxial annular surface. This deflection problem is described in detail together with a manner for adjusting or compensating for it in U.S. patent application Ser. No. 935,257 filed Aug. 21, 1978 now U.S. Pat. No. 4,227,816 by Zehev Tadmor and Peter Hold, two of the inventors of this application. The rotor or shaft deflection problem and its effect on clearances between the top surfaces of the rotatable channel wall(s) and the stationary interior coaxial annular surface is also described in detail in U.S. patent application Ser. No. 935,782 filed Aug. 22, 1978 also by Zehev Tadmor and Peter Hold. In that application, sealing means comprising nested truncated conical members of thin stiffy resilient material are provided for rotary processors. U.S. patent application Ser. Nos. 935,257 now U.S. Pat. No. 4,227,816 and 935,782 are expressly incorporated here by reference.

The present invention is also addressed to the leakage problem in rotary processors and presents to the art improved, novel rotary processors having sealing means which can effectively minimize or prevent leakage at high or low pressures between substantially coaxial surfaces which move relative to each other.

BRIEF SUMMARY OF THE INVENTION

The present invention presents to the art a novel low friction seal which controls leakage of material between relatively moving coaxial annular surfaces. The novel sealing means of this invention are particularly adapted to control leakage of liquid between the relatively narrow peripheral portion adjacent a rotatable channel in a rotor and the stationary coaxial annular surface closing the channel and in which the clearance between the surfaces permits entry of only a thin film of liquid material. A seal is provided which can effectively minimize or prevent leakage of that thin film of liquid material between two surfaces at or near the clearance and which move relative to each other. Essentially, that seal is provided by a plurality of preferably parallel, helical or oblique sealing channels arranged on one of the relatively moving surfaces so that liquid moved into the clearance during relative movement can penetrate the sealing channels. The effective width of the surface carrying the helical channels and the number and the angle of the helical channels on the surface and the dimensions or geometry of the helical channels are selected so that relative motion between the surface carrying the helical channels and the other surface provides an effective pumping action which opposes and resists flow of liquid material through the clearance to thereby control the length of penetration of liquid into the channel.

The invention and particularly the preferred embodiments of it also provide novel seals which minimize or reduce power loss at the seal between the relatively moving surfaces and can effectively minimize or prevent external leakage of material from end passages of rotary processors or internal leakage of material from one passage of the processor to another.

DESCRIPTION OF THE DRAWINGS

FIG. 7a is a top view of the end channel wall and scraper of FIG. 7.

FIG. 7b is a section of the end channel wall and scraper taken along line 7b—7b of FIG. 7a.

FIG. 8b is a section of the channel wall and scraper of FIG. 8 taken along line 8b—8b of FIG. 8a.

FIG. 11 is a section of a channel showing an alternative embodiment of the invention.

FIG. 11a is an end view of one of the surfaces providing the dynamic seal of the alternative embodiment shown in FIG. 11.

FIG. 11b is a top view partly in section of the dynamic seal of FIG. 11 showing the relationship of a stationary scraper and a rotating surface carrying a plurality of helical sealing channels.

FIG. 12 is a view similar to FIG. 11 showing still another alternative embodiment of the invention.

FIG. 12a is an end view of one of the surfaces providing the dynamic seal of the alternative embodiment shown in FIG. 12.

FIG. 12b is a top view of the parts shown in FIG. 12 showing the relationship of a scraper with a stationary surface carrying a plurality of helical sealing channels.

FIG. 13 is a fractional sectional view on an enlarged scale showing an alternative embodiment of this invention.

FIGS. 14 and 14a are similar to FIGS. 3 and 4 respectively showing an alternative embodiment of the invention.

FIGS. 15 and 15a are also similar to FIGS. 3 and 4 respectively showing an alternative embodiment of the invention.

FIGS. 16 and 17 are each fractional sectional views on an enlarged scale each showing an alternative embodiment of the invention.

DESCRIPTION OF THE PREFERRED EMBODIMENT

Figure 1:
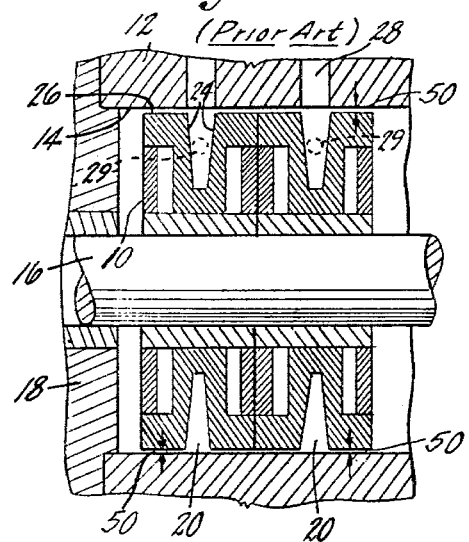
FIG. 1 is a side elevation with parts broken away to show a rotor, channel and annular coaxial surface providing individual basic processing units of a multi-unit rotary processor of the type described in U.S. Pat. No. 4,142,805.

The invention will be described in relation to its use in a multi-passage rotary processor apparatus such as shown in referenced U.S. Pat. No. 4,142,805 and application Ser. No. 898,178 now U.S. Pat. No. 4,194,841. It should be understood however that the dynamic seals described are useful in other applications where a seal is needed between surfaces rotating relative to each other.

As described in greater detail in U.S. Pat. No. 4,142,805 and application Ser. No. 898,178 now U.S. Pat. No. 4,194,841 rotary processor apparatus (see FIG. 1) includes a rotatable element comprising a rotor 10 which is mounted for rotation in housing 12 having a cylindrical interior surface 14, the rotor being supported on drive shaft 16 journalled in end walls 18 of housing 12. Rotor 10 has a plurality of channels 20, each including opposed side walls 24 in fixed relation to each other, and top surface portions 26, coaxial with, and in close, spaced relation to, stationary interior surface 14 of housing 12 on each side of channel 20. Rotatable channel 20 and stationary interior surface 14 of the housing 12 form a basic processing passage into which material is introduced for processing through an inlet opening 28. Movement of the channel drags material in contact with the channel walls 24 to a member providing a material collecting end wall surface (not shown). Collected processed material is discharged through outlet opening 29 in housing 12. Pressure is generated by dragging of material on channel walls 24 toward the material collecting end wall surface so that the channel becomes a region of high pressure increasing in the direction of rotation.

As shown in FIG. 1, there is a close clearance 50 between top surface (s) 26 and stationary interior surface 14 of housing 12. Ideally, clearance 50 should be about 10 mils or less and preferably between about 3–5 mils. Generally, clearance 50 should be substantially constant about the circumference of the passage. However, as described in referenced U.S. patent application Ser. Nos. 935,257 and 935,782 mentioned before, maintenance of such a close, constant clearance can be complicated by the differential radial pressures generated along the circumference of the channel. This imbalance of radial pressures may be sufficient to cause shaft or rotor deflection from a high pressure region toward a low pressure region. Obviously, any deflection can affect the maintenance of the desired close, constant clearance because additional clearance must be provided to compensate for the extent of any deflection. In U.S. application Ser. No. 935,257 now U.S. Pat. No. 4,227,816 deflection is controlled by disposing flow director units in radially opposing relation so that the radial pressures generated in one part of a processing passage or group of processing passages are balanced by radial pressures generated in another part. While shaft deflection control can reduce leakage, it is oftentimes desirable to provide auxiliary or additional sealing means to minimize leakage to the greatest extent possible. This invention provides novel sealing means for controlling leakage between surfaces moving relative to each other at or near clearance 50.

Figure 2:
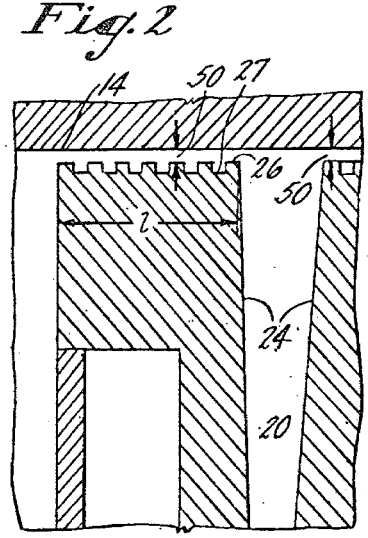
FIG. 2 is a portion of FIG. 1 on an enlarged scale showing the relationship between two surfaces providing a dynamic seal of this invention.
Figures 3, 4:
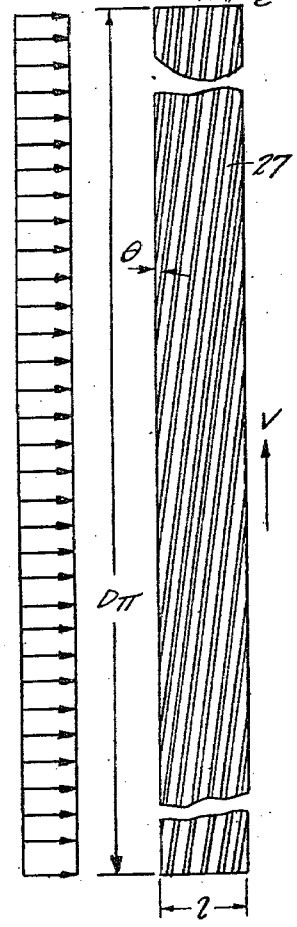
FIG. 3 is a diagrammatic view showing further relationships between the surfaces providing a dynamic seal of this invention.
FIG. 4 is a diagrammatic view of the cylindrical, peripheral portion of one of the surfaces shown in FIGS. 2 and 3 developed into a plane and having a plurality of helical sealing channels.

One form of dynamic seal of this invention is shown in FIGS. 2, 3 and 4 where a plurality of oblique, preferably, narrow, sealing channels 27 are formed in and/or carried by surface 26 between channel side walls 24 to provide a dynamic seal between surface 26 and the stationary coaxial surface 14 of housing 12. As shown, the oblique sealing channels 27 are preferably cut into surface 26 and move relative to the smooth surface 14 of housing 12. The most important relationships between the various design parameters of the dynamic seal of this invention are given in FIGS. 3 and 4 and reference should be made to those Figures in connection with the following description and explanation of the dynamic seals of this invention.

As mentioned, essentially the above described dynamic seal is achieved by providing one of two relatively moving surfaces near or at clearance 50 with a plurality of oblique, preferably parallel sealing channels. In effect, each oblique sealing channel functions as a segment of an extruder screw flight with stationary coaxial surface 14 acting as a barrel for the plurality of sealing channels (or plurality of extruder screw flight segments). Accordingly, the net flow q of liquid across the width ($f$) of surface 26 may be determined using the same analysis which applies to a screw extruder. Thus, the net flow is the difference between the drag flow in one direction and the pressure flow in the opposite direction or $$q = q_D - q_P \qquad \text{(Equation A)}$$

where:
$q_D$ is the theoretical drag flow,
$q_P$ is the theoretical pressure flow.

For illustrative purposes, the dynamic seal of FIGS. 2–4 is shown graphically in FIG. 4 acting against a constant pressure and the total net flow q equals zero under equilibrium conditions or, $q_D = q_P$. The drag flow $q_D$ is only a function of sealing channel geometry and the speed of operation. However, the pressure flow, $q_P$ for a given pressure is inversely proportional to the length of penetration of liquid in the channel, i.e. to the length of channel which is filled with liquid. Under conditions, as shown in FIGS. 3 and 4, equilibrium therefore will be reached as soon as the liquid has penetrated the sealing channels to a length which reduces the pressure flow (which tries to move the liquid into the channel) to a value which is equal to the drag flow. If that length of penetration measured in the axial direction is less than the length of the sealing channel 27, no liquid will leak across the width ($f$) of helical sealing channel carrying surface 26.

Figures 5, 6:
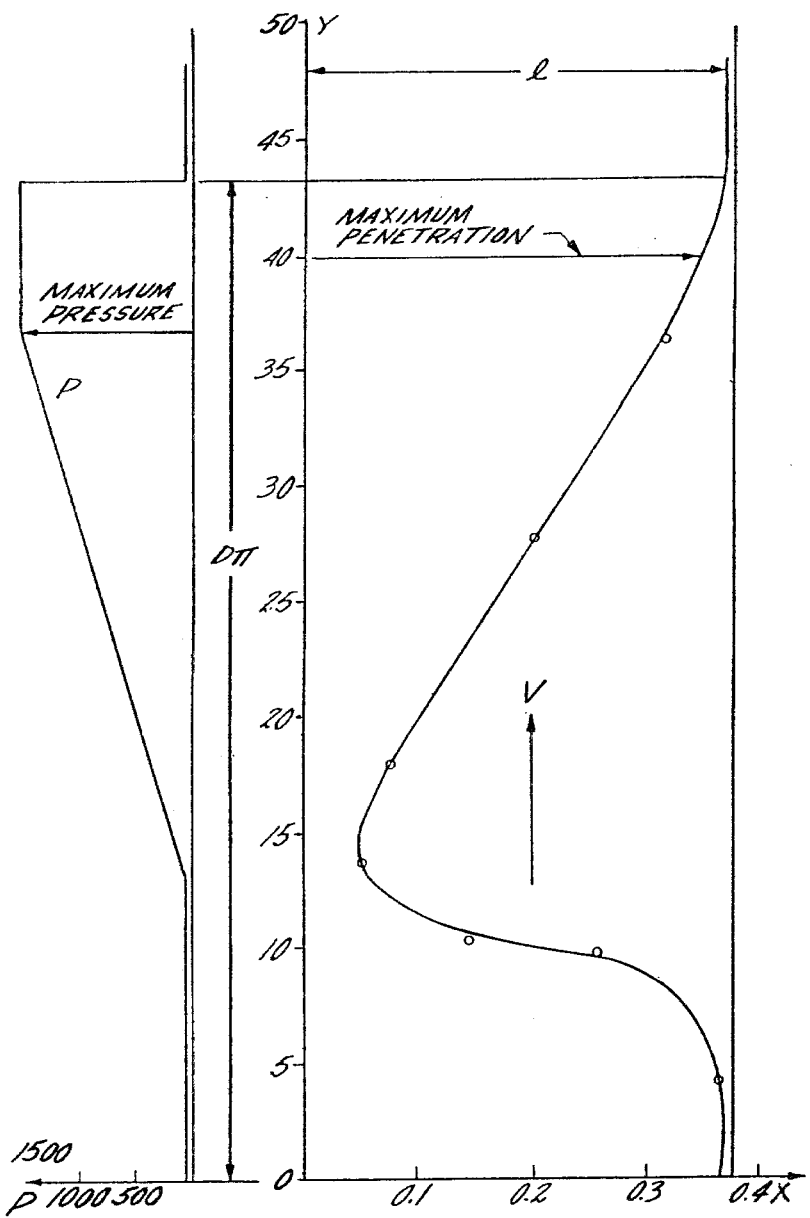
FIG. 5 is a graphic representation of the pressure profile developed along the circumference of a typical basic processing passage of a multi-unit rotary processor of FIG. 1.
FIG. 6 is a graphic representation of the computed length of penetration of liquid into helical sealing channels obtained for the pressure profile of FIG. 5.

The dynamic seal of this invention however does not operate under conditions of constant pressure as discussed in connection with FIG. 4. Instead, FIG. 5 illustrates a typical pressure profile developed along the circumference of a rotary processor passage. After a period of relatively low pressure, the pressure in the passage increases gradually, reaches a maximum value at the end of the passage and then drops suddenly beyond an obstruction such as a channel block back to the original low level. The dynamic seal of this invention therefore usually works against variable pressure which repeats periodically during each revolution of channel walls 24. The length of penetration of liquid into helical sealing channels 27 for the pressure profile shown in FIG. 5 has been computed by an appropriate dynamic model and is shown in FIG. 6 opposite the pressure profile. One can see that as soon as the pressure drops suddenly, the length of penetration of liquid in a sealing channel is gradually reduced to a point roughly opposite to the onset of pressure increase. From there on, the length of penetration of liquid in a sealing channel increases again. In general it can be said that the net flow q (equation A) never reaches equilibrium during any one revolution. Due to the time required to empty the liquid from a sealing channel when the pressure is lowest or to refill it with the liquid when the pressure is the greatest, the length of penetration of liquid in a sealing channel lags or leads the pressure profile. For example, after the sudden drop of pressure indicated in FIG. 5, there is only a gradual reduction in the length of penetration of liquid in a sealing channel. However, by making the length of each sealing channel long enough so that the length of penetration of liquid never exceeds the length of the helical sealing channel(s), unwanted leakage cannot occur across the width ($f$) of a surface carrying a plurality of helical sealing channels.

The preferred dynamic seals of this invention are those which are multi-flighted and have many, preferably parallel, helical sealing channels—with a relatively small helix angle $\Theta$. The small helix angle $\Theta$ is desirable in order to provide sealing channels having minimum penetration lengths for a sealing channel bearing surface having a relatively narrow width ($f$). Helix angles $\Theta$ below about 20° are especially suitable for the dynamic seals of this invention.

The number of sealing channels employed to provide the dynamic sealing means of this invention is an important consideration. Because channel wall 24 has a relatively large outside diameter O.D. a multi-flighted sealing channel carrying surface 26 is particularly desirable because the lead L of the helical sealing channel 27 is larger than the width ($f$) of the sealing surface 26. Accordingly, a plurality of preferably parallel helical sealing channels are formed to provide an effective dynamic seal. There is also another reason for using a plurality of helical sealing channels. For a net flow q equal to zero, pressure flow and drag flow have to be equal. However, as the ratio of sealing channel depth H (FIG. 3) to sealing channel width W (FIG. 4) increases, i.e. with decreasing channel width W, the pressure flow value in Equation A decreases faster than the drag flow value. Referring to Equation A above, it is apparent that under these circumstances, namely for decreasing channel width W, the seal becomes more efficient which means that zero net flow can be achieved at lower penetration lengths of liquid in the sealing channel. Also, it is apparent from the equation for channel width W (FIG. 4) that an increasing number of channels results in a reduction of channel widths. Narrow sealing channel widths W are particularly desirable in the practice of the invention because of the differential radial pressures encountered about the circumference of the passage. By using a plurality of parallel, helical sealing channels having narrow widths W, the pressure variations acting on each individual sealing channel at any time is held to a small value and each channel acts independently.

Referring again to FIG. 6, the boundary of penetration of liquid shown represents the area over which the sealing channels 27 are filled during a complete revolution of the helical sealing channel carrying surface 26. That area also corresponds to the area of stationary coaxial interior annular surface 14 which is contacted with liquid. This contact of liquid with the helical sealing channel carrying surface 26 and coaxial interior annular surface 14 creates a shearing action providing the desirable drag flow which limits the extent of penetration of liquid in the sealing channels. However, this shearing action also provides an undesirable power loss at the seal because of dissipation of energy into heat.

Figure 7:
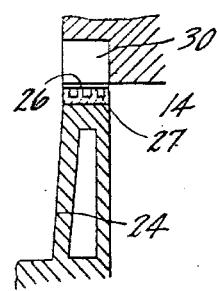
FIG. 7 is a side elevation partly in section of an end channel wall of a multi-passage rotary processor showing the relationship between a stationary scraper and a rotating surface carrying a plurality of helical sealing channels.
Figures 7A, 7B:
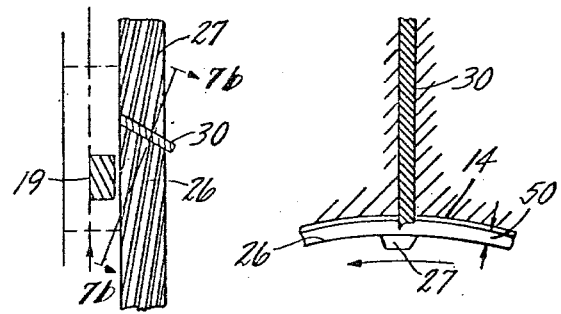

In accordance with a particularly preferred embodiment of this invention, power loss at the novel dynamic seals can be substantially reduced by breaking liquid contact between the surfaces forming the dynamic seal during a portion of each revolution of one of the surfaces providing the dynamic seal. This embodiment is illustrated in FIGS. 7, 7a, 7b, in FIGS. 8, 8a 8b and in FIGS. 9 and 10. As shown in FIGS. 7, 7a and 7b, a scraper 30 is positioned on the inlet side of a channel block 19 (FIG. 7a) to scrape liquid off the helical sealing channel bearing surface 26 which provides a dynamic seal designed to prevent unwanted external leakage from the end passage of a rotary processor. The scraping clearance between the scraper 30 and peripheral portions 26 of helical sealing channels 27 must be close. Preferably, the scraping clearance should be close enough to scrape off most of the liquid contacting the helical sealing channel surface 26 and stationary interior coaxial, annular surface 14. Accordingly, after scraping, liquid contact between the surface 26 carrying helical sealing channels 27 and surface 14 is broken and the sealing channels 27 remain filled with liquid to the extent they were filled before the scraping. Power loss by dissipation of energy at the dynamic seal is therefore reduced after scraping and does not increase again until sufficient liquid is pumped into the helical sealing channel(s) to reestablish liquid contact between the coaxial annular surfaces of the dynamic seal. Liquid material scraped off the helical sealing channel carrying surface is discharged into the inlet at low pressures.

Figure 8:
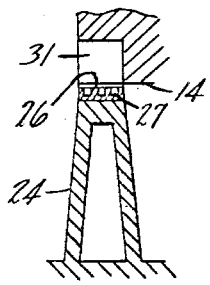
FIG. 8 is a side elevation partly in section of interior walls for adjacent channels of a multi-unit rotary processor showing the relationship of a stationary scraper and a rotating surface carrying a plurality of helical sealing channels.
Figure 8A:
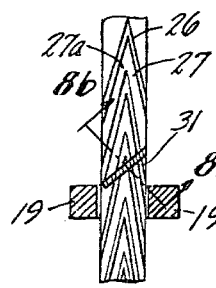
FIG. 8a is a top view of the channel wall and scraper of FIG. 8.
Figure 8B:
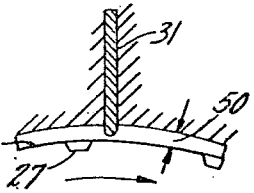

FIGS. 8, 8a and 8b illustrate a scraper 31 cooperating with an alternate form of dynamic seal of this invention established between the surfaces defining clearance 50. As shown, two sets of intersecting helical sealing channels 27 and 27a are arranged on the peripheral surface 26 between the channel walls 24 of adjacent processing passages with the helices of the sealing channels of each set opposed to each other. The scraper 31 is positioned on the inlet side of the channel blocks 19 (FIG. 8a) and is maintained in close scraping relationship with the helical sealing channel bearing surface 26 to break liquid contact between the dynamic seal providing surfaces and to discharge the scraped material into the inlet.

Figures 9, 10:
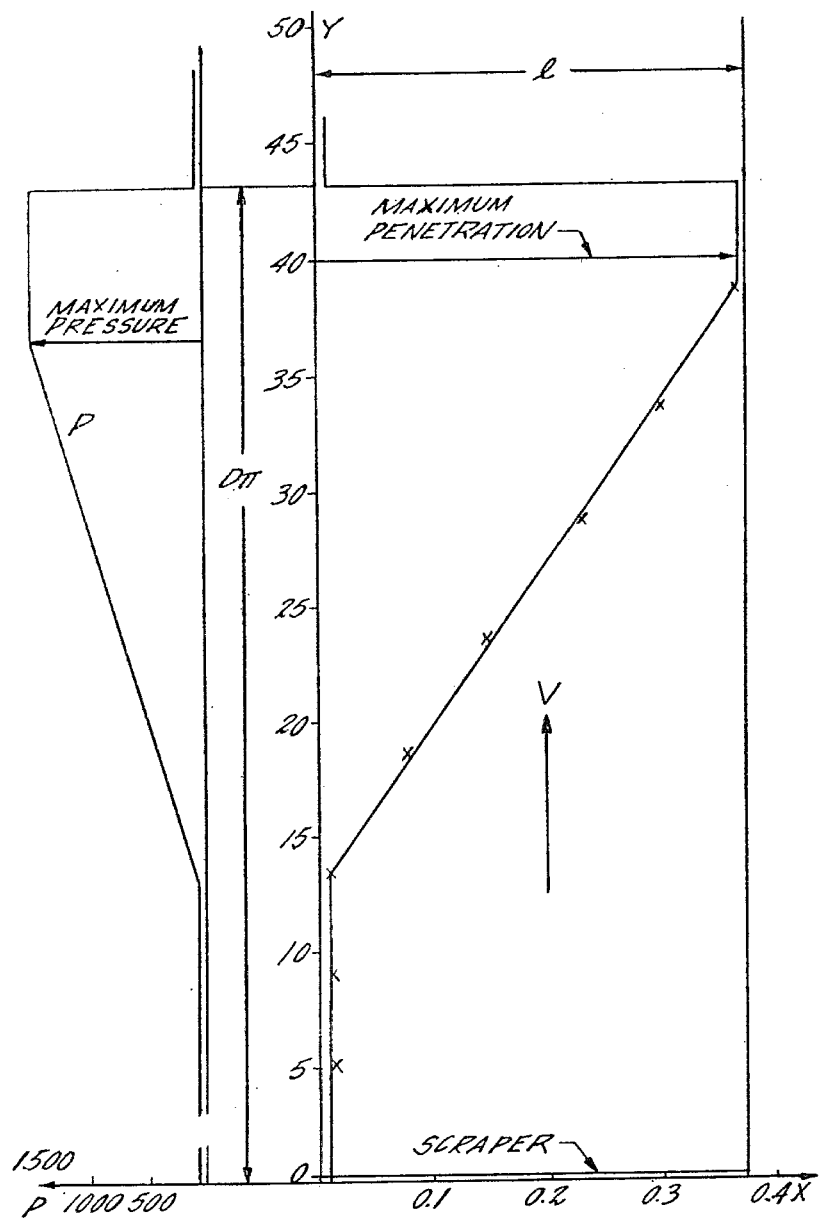
FIG. 9 (like FIG. 5) is a graphic representation of the pressure profile developed along the circumference of a typical basic processing passage of a multi-unit rotary processor of FIG. 1.
FIG. 10 is a graphic representation of the computed length of penetration of liquid into helical sealing channels obtained for the pressure profile of FIG. 9 and showing the effect on the length of penetration of liquid by periodically scraping liquid from surfaces providing the dynamic seal of this invention.

The advantages of breaking liquid contact between surfaces of dynamic seals of this invention are further illustrated in FIGS. 9 and 10. FIG. 9 (like FIG. 5) illustrates a typical pressure profile developed along the circumference of a rotary processor passage. The computed length of penetration of liquid into helical sealing channels for the pressure profile of FIG. 9 but having a scraper cooperating with the helical sealing channel carrying surface as illustrated and described before, is shown in FIG. 10. As shown there, scraping is done at the inlet or at or near the low pressure area of the passage. The scraping breaks liquid contact between the surfaces of the dynamic seal but leaves the helical sealing channels filled to some level with liquid. Because the layer providing liquid contact between the surfaces of the dynamic seal is removed, there is reduced power loss and very little penetration of liquid in the area extending from the back of the scraper 30 or 31 up to about 13 on the scale of FIG. 10. However, once the pressure starts increasing, length of liquid penetration immediately and very closely follows the pressure profile with maximum penetration occuring rather close to maximum pressure. A comparison of FIG. 10 with FIG. 5 shows that the area of maximum liquid penetration of FIG. 10 is considerably smaller than the maximum liquid penetration area of FIG. 5. Consequently, a scraper provides reduced power losses without impairing the efficiency of the dynamic seal.

In the embodiments of the invention described so far, the dynamic seals are established between the surfaces defining clearance 50 (FIGS. 2 and 3). However, dynamic seals within the scope of this invention can be established between other surfaces located near—rather than at—clearance 50. FIGS. 11, 11a, 11b, 12, 12a and 12b illustrate such alternative embodiments of the invention. FIG. 11 illustrates a dynamic seal in which a portion of the external surface 32 of rotor 10 is provided with a plurality of oblique sealing channels 35 extending along the external surface 32. The portion of the external surface 32 carrying the plurality of sealing channels 35 is shown as width ($f$) (FIG. 11 and 11a). Surface 32 carrying the sealing channels moves in rotation relative to stationary surface 33 spaced apart from the sealing channel carrying surface by a fixed, close clearance 51 which can be the same, or greater than, or less than clearance 50 but usually is about 10 mils or less. Stationary surface 33 is provided by a stationary annular element 34 securely fixed to stationary interior surface 14 of the housing 12. FIG. 11a is a view of the exterior surface 32 of rotor 10 showing a plurality of spiral sealing channels 35 provided in width ($f$) which extends about the outer circumferential regions of the exterior surface 32. While the grooves are shown in FIG. 11a in curved spiral form, the grooves also may be straight and obliquely arranged without departing from the scope of the invention. FIG. 11b is a top view showing the relationship between the surfaces 32 and 33 forming the dynamic seal of FIG. 11 and a scraper 36. As shown, scraper 36 is fixedly in stationary annular member 34 and extends outwardly from surface 33 to break liquid contact between surface 33 and surface 32. Scraper 36 extends at least across width ($f$) and is positioned at or near the inlet (not shown) of the passage.

FIG. 12, 12a and 12b illustrate another alternate form of dynamic seal established between surfaces near—rather than at—clearance 50. In the embodiment shown, a plurality of helical or oblique sealing channels 37 are provided on a stationary surface 38 of an annular element 39 fixed to stationary interior surface 14 of the housing 12. Width ($f$) of stationary channel carrying surface 38 is positioned spaced apart from a portion of an external surface 40 of rotor 10 by clearance 51. FIG. 12a is a schematic side view of annular element 39 showing the plurality of sealing channels 37 provided in width ($f$) of surface 38. FIG. 12b is a top view showing the relationship between the surfaces forming the dynamic seal of FIG. 12 and a scraper 41. Scraper 41 is fixedly positioned in and firmly held by stationary annular member 39 and extends outwardly from surface 38 to break liquid contact between surfaces 38 and 40. As shown in FIG. 12a, scraper 41 extends at least across width ($f$) and, as in the case of all scrapers described before, is positioned at or near the inlet (not shown) or in a low pressure area of the passage.

The dynamic seal illustrated in FIGS. 12, 12a and 12b differs somewhat from the dynamic seals described before in that the plurality of sealing channels were carried by a rotating surface. In the dynamic seal of FIGS. 12, 12a and 12b, the plurality of sealing channels are formed in a stationary surface. As already discussed, the length of penetration of liquid into each sealing channel carried by a rotating cylindrical surface will vary progressively during each revolution because of the differential pressures encountered along the circumference of the passage, as graphically illustrated in FIGS. 5, 6, 9 and 10. This variation in length of penetration of the liquid into each helical sealing chamber is not encountered during each revolution with dynamic seals having a stationary, helical sealing channel carrying surface. Instead, because each sealing channel is always at a fixed position about the circumference of the passage, each helical sealing channel always "sees" the same head pressure during every revolution of channel walls 24 of rotor 10. Accordingly, the length of penetration of liquid into each stationary sealing channel will differ but the maximum length of penetration into any given channel will always be substantially constant so long as a constant pressure is applied to that sealing channel during each revolution of rotor 10. Again however, so long as the length of penetration of liquid into any of the helical channels on the stationary surface does not exceed the length of any sealing channel, unwanted leakage between the surfaces will not occur.

FIG. 13 illustrates another alternate dynamic seal of this invention also formed between the cylindrical surfaces defining gap 50 but which functions in the same manner as described for the dynamic seal of FIGS. 12, 12a and 12b. As shown in FIG. 13, the helical sealing channels 42 are formed in the stationary interior surface 14 of housing 12 which is coaxial with and spaced apart from top surface portions 26 of rotor 10 by clearance 50. Accordingly, the length of penetration of liquid into each helical sealing channel 42 carried by the stationary interior surface 14 will vary. But as in the dynamic seal of FIGS. 12, 12a and 12b, the maximum length of penetration of liquid into any given helical channel 42 at a fixed pressure position along the rotating channel wall will always be substantially constant so long as constant pressure is applied at that fixed position. Accordingly, so long as the length of penetration of liquid into any stationary helical sealing channel 42 does not exceed the length of the channel, leakage of liquid across the dynamic seal established between the surfaces at clearance 50 will not occur.

In the description of the invention so far, leakage of liquid at the clearance defined by the two coaxial surfaces is controlled by a plurality of helical or oblique sealing channels carried by one of the surfaces. Such features of the sealing channels as the number, geometry, dimensions and angle are selected so that the length of liquid penetration into each sealing channel does not exceed the length of the sealing channel penetrated. It should be understood however, that the prime function of the dynamic seals of this invention is to resist the extent of penetration of fluid in the channel to thereby control the amount of liquid leakage at the clearance. A degree of that control can still be achieved even though the length of penetration of leakage fluid into a channel exceeds the length of the channel penetrated. Under such circumstances, some leakage of the liquid will occur at the clearance but the helical sealing channels would provide control over the amount of leakage and the amount would be less than that which would occur without the sealing channels.

FIGS. 14, 14a, 15 and 15a illustrate embodiments of this invention in which effective control of liquid leakage at the clearance can be achieved even though the penetration of liquid leakage exceeds the length of the sealing channel. The embodiment shown in FIGS. 14 and 14a involves a plurality of helical sealing channels 27 carried on the peripheral surface 26 of channel wall 24. As shown there, the width ($f$) of the sealing channel carrying surface does not extend across the total width of surface 26 and the penetration of liquid into channels 27 can exceed the length of channels 27. However, a liquid penetration collecting channel 57 is provided to collect the liquid penetrating channels 27 and retain the collected liquid until it can be discharged through channels 27 at the low pressure regions of the passage. Liquid penetration collecting channel 57 preferably has about the same depth H (FIG. 4) as channel(s) 27.

FIGS. 15 and 15a illustrate a modification of the embodiment shown in FIGS. 14 and 14a. Again, the width ($f$) of the sealing channel carrying surface only occupies a portion of the total width of surface 26. Instead, recessed portion 59, the width of the sealing channel carrying surface ($f$) and liquid penetration collecting channel 57 are arranged across the total width of surface 26 of channel wall 24. The depth of liquid penetration collecting channel should preferably be the same as depth H (FIG. 4) of channel(s) 27. The depth of recessed portion 59 can be the same or different depth of channel(s) 27 or recessed portion 59 may be tapered downward (not shown) from surface 26.

The various alternate forms of dynamic seals are described with reference to multi-passage rotary processors comprising at least one but preferably a plurality of the dynamic seals of this invention to prevent unwanted external leakage of liquid from one or more end units of the processor or to prevent unwanted internal leakage of liquid from one or more channels to another. Accordingly, the dynamic seals of this invention are preferably integrated with multi-passage rotary processors of the type generally described in U.S. Pat. No. 4,142,805 and which has been incorporated here by reference. Essentially, the multi-unit processors of that application are those in which the rotor carrying the processing channels has cylindrical portions between the processing channels which are in close relation to the housing of the rotor.

In a preferred form of such processors as described in application Ser. No. 935,257 filed Aug. 21, 1978 now U.S. Pat. No. 4,227,816 transfer passages between channels are provided by removable flow director units which are held by the processor housing and include surface portions forming part of the surface of the annular housing and with the transfer channels formed in these surface portions of the flow director units. The flow director units may also carry the channel end blocks which extend into the processing channels of the rotor. In a further form, transfer passages and end blocks are circumferentially and/or axially disposed to reduce bearing load to develop opposed radial forces in the processing channels. For example, the annular passages, blocking members and transfer passages may be arranged to develop radial forces in at least one of the annular passages to oppose radial forces developed in at least one other annular passage to provide substantial axial balance of radial forces. Axial balance of radial forces is desirable because shaft or rotor deflection is minimized thereby providing closer and better control over clearances between the surfaces providing the dynamic seals of this invention.

The dynamic seals of this invention are generally adapted to provide sealing between surfaces spaced apart from each other by clearances up to about 10 mils. However, the dynamic seals of this invention are particularly effective if the surfaces providing the seals are spaced apart from each other by clearances of about 5 mils or less. Accordingly, the degree of shaft or rotor deflection is a factor that should be considered in selecting the particular dynamic seal of this invention for use in a rotary processor.

Still other advantages can be obtained by integrating the dynamic seals of this invention with the structure of the seal described in copending application Ser. No. 935,782 filed Aug. 21, 1978 by Peter Hold and Zehev Tadmor which is also incorporated herein by reference. According to that application the seal includes nested truncated conical members of stiffly-resilient material positioned between relatively rotatable coaxial surfaces with inner edge portions of the members providing a surface adjacent and in flow resistent relation to one coaxial surface, and outer edge portions providing a surface adjacent and in flow resistant relation to the other coaxial surface. Marginal portions at either the inner or outer portions of the members are held to enable pressure against the members to force the outer or inner edges respectively into improved sealing relation to their adjacent surfaces.

FIGS. 16 and 17 illustrate the integration of the dynamic sealing means of the present invention with the seal structure described in copending application Ser. No. 935,782. As shown in FIGS. 16 and 17, truncated conical members 44 are carried by rotor 10 in an orientation such that surfaces 43 of member 44 slope toward channel 20, i.e. the high pressure region. The inner edges 45 of member 44 farthest from channel 20 are held against axial movement and in sealing relation to the rotor by shoulder 46 and a retaining member, such as a ring 47. Retaining member 47 acts on the member 44 farthest from the channel to keep member 44 in nested relation against shoulder 46. The outer free edges 48 of the members closest to channel 20 provides a surface 49 which is in sealing relation to interior cylindrical surface 14 so that members 44 seal the space between surface 49 and interior surface 14 of housing 12. According to the embodiment of the invention shown in FIG. 16, surface 49 can be provided with a plurality of helical sealing channels 52 to improve sealing between surface 49 and surface 14. The embodiment of the invention shown in FIG. 16 is particularly preferred if deflections of the shaft require that clearances greater than about 0.005 inch be maintained between surface 49 and surface 14. FIG. 17 shows an alternative arrangement of the elements of the dynamic seal of FIG. 16. As shown in FIG. 17, a plurality of helical sealing channels are provided on interior surface 14 to provide a dynamic seal between helical sealing channel carrying surface 14 and surface 49.

Figure 18:
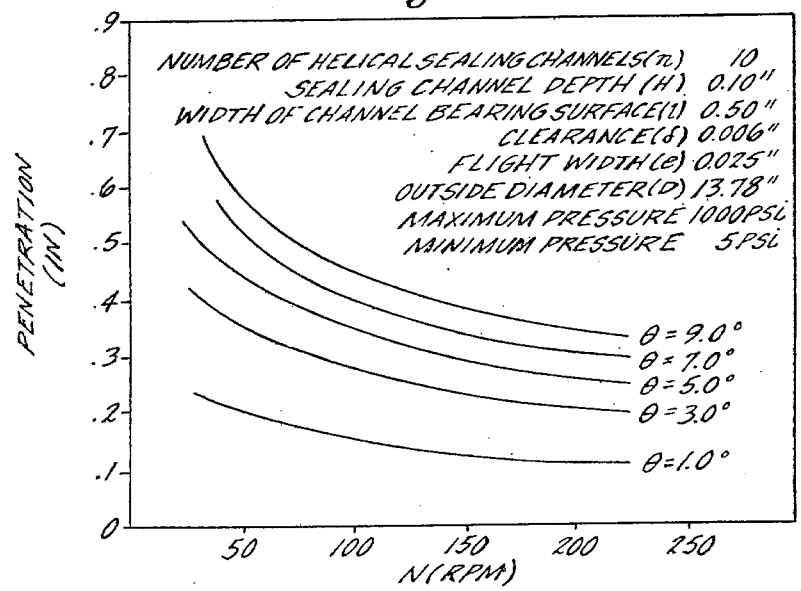
FIGS. 18, 19 and 20 are graphical representations of the penetration length of liquid into a plurality of helical sealing channels in response to different conditions such as the number and angle of helical sealing channels and the speed of rotation of the sealing channel carrying surface.
Figure 19:
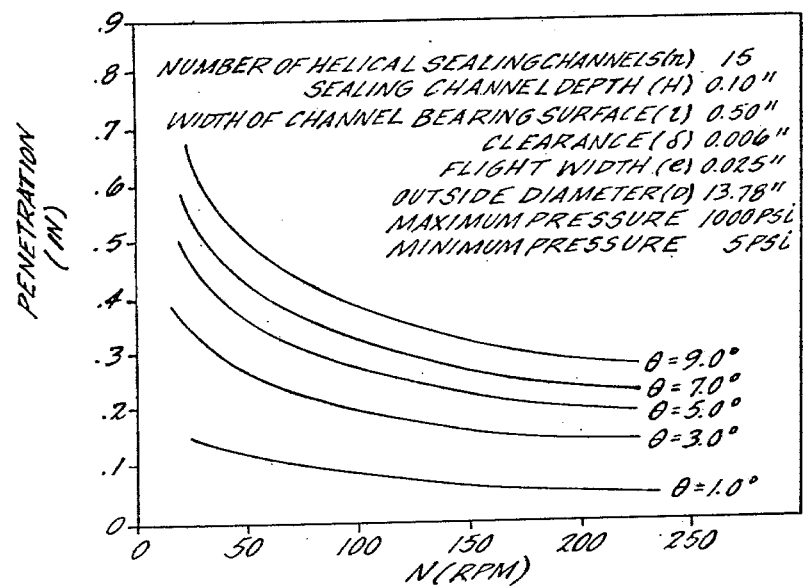
Figure 20:
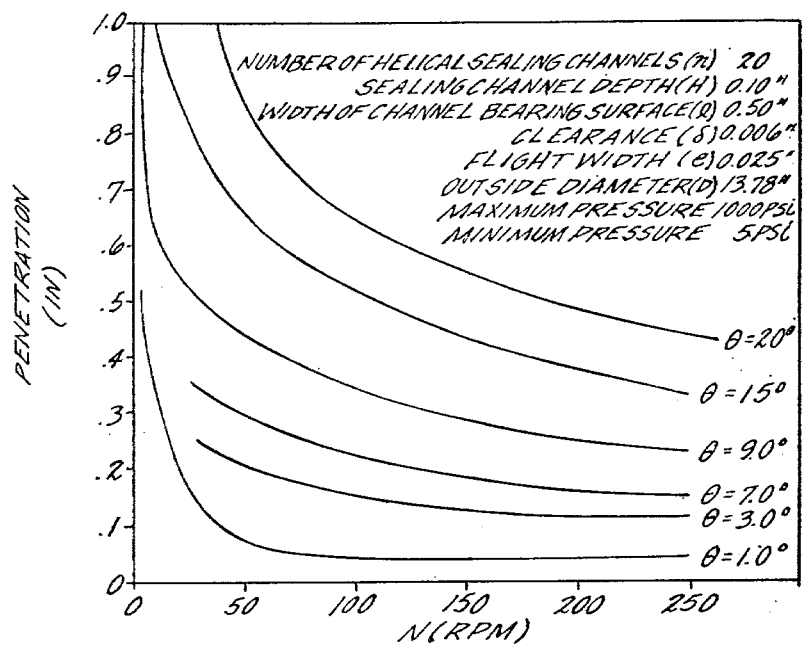

Additional details relating to the invention will be appreciated by reference to FIGS. 18, 19 and 20. These Figures illustrate computation of the maximum liquid penetration length into each sealing channel versus RPM for several values of ($f$). The width ($f$) of the sealing channel bearing surface and the number and geometry of the sealing channels as well as other operating conditions are described in each Figure. These Figures indicate that about 10 or more channels of the defined geometry and having an axial length of about 0.5" can control leakage of liquid across width ($f$), particularly if the value of $\Theta$ is low, e.g. below 15°. It should be mentioned that the maximum pressure of 1000 psi is well above that normally expected to be generated in a passage of a rotary processor. The maximum pressure however was selected to determine maximum axial penetration lengths of liquid into the sealing channels of the indicated geometry or dimensions under extreme operational conditions.

From the above description it should be apparent that the present invention presents to the art novel sealing means for controlling leakage of liquid between two relatively rotatable, coaxial closely spaced apart surfaces. The sealing means of this invention is particularly adaptable to rotary processors for processing liquid and/or solid polymeric materials in a more efficient fashion providing a low friction positive seal for controlling external or internal leakage of liquid with minimal power loss at the seal. Accordingly, this invention presents to the art new and useful apparatus providing particularly desirable and unexpectedly improved overall performance characteristics over apparatus known to the art at the time this invention was made.

What is claimed is:

1. Apparatus for processing materials which comprises:

a rotatable element having a surface carrying at least one processing channel including opposed channel side walls;

a stationary element providing a coaxial surface spaced apart from said surface of the rotatable element by a close clearance and cooperatively arranged with the processing channel to form an enclosed annular processing passage; said stationary element also having associated with it an inlet for feeding material to the passage, an outlet spaced apart from the inlet for discharging material from the passage and a member located in the channel providing a surface for restraining movement of the main body of material in the passage so that on rotation of said rotatable element in a direction from the inlet toward the material restraining surface, the rotatable element and the restraining surface providing member coact so that material in contact with the channel side walls is dragged toward the restraining surface and pressure increases along the length of travel of the channel side walls from the inlet towards the restraining surface and, dynamic sealing means for preventing leakage of the pressurized material past said clearance including a plurality of helical sealing channels carried by one of said surfaces, arranged so that said liquid material can penetrate said sealing channels, the width of said one surface, the number, angle and geometry of said sealing channels being selected so that the outward penetration of said clearance and said sealing channels by the pressurized liquid is opposed by the inward force applied to the liquid in the sealing channels as the surfaces are relatively rotated to resist the extent of outward penetration of pressurized liquid in any of said sealing channels.

2. Apparatus of claim 1 where the width of said one surface, the number, angle and geometry of said sealing channels are selected so that the outward penetration of said clearance and said sealing channels by the pressurized liquid is opposed by the inward force applied to the liquid in the sealing channels as the surfaces are relatively rotated to prevent the extent of outward penetration of pressurized liquid from exceeding the length of any sealing channel.

3. Apparatus for processing materials which comprises:

a rotatable element having a surface carrying a plurality of processing channels including opposed channel side walls;

a stationary element providing a coaxial surface spaced apart from said surface of the rotatable element by a close clearance and cooperatively arranged with the processing channel to form an enclosed annular processing passage; said stationary element also having associated with it an inlet for feeding material to the passage, an outlet spaced apart from the inlet for discharging material from the passage and a member located in the channel providing a surface for restraining movement of the main body of material in the passage so that on rotation of said rotatable element in a direction from the inlet toward the material restraining surface, the rotatable element and the restraining surface providing member coact so that material in contact with the channel side walls is dragged toward the restraining surface and pressure increases along the length of travel of the channel side walls towards the restraining surface and, dynamic sealing means for preventing leakage of the pressurized material past said clearance including a plurality of helical sealing channels carried by said process channel carrying surface of the rotatable element and arranged so that said liquid material can penetrate said sealing channels, the width of said surface carrying said sealing channels, the number, angle and geometry of said sealing channels being selected so that the outward penetration of said clearance and said sealing channels by the pressurized liquid is opposed by the inward force applied to the liquid in the sealing channels as the surfaces are relatively rotated to resist the extent of outward penetration of pressurized liquid in any of said sealing channels.

4. Apparatus of claims 1 or 2 or 3 in which said two surfaces are spaced apart from each other by a clearance which is about 10 mils or less.

5. Apparatus of claims 1 or 2 or 3 in which said two surfaces are spaced apart from each other by a clearance which is about 5 mils or less.

6. Apparatus of claims 1 or 2 or 3 in which said plurality of helical sealing channels are arranged substantially parallel to one another.

7. Apparatus of claims 1 or 2 or 3 in which the helix angle of each of said plurality of helical sealing channels is about 20° or less.

8. Apparatus of claims 1 or 2 or 3 in which the helix angle of each of said plurality of helical sealing channels is about 15° or less.

9. Apparatus of claims 1 or 2 or 3 in which the dynamic sealing means includes nested truncated conical members of stiffly resilient material, said members having a surface adjacent the outer edges arranged closest to the portion of the apparatus containing the pressurized liquid so as to be displaceable by pressure, and means for holding the inner edges of the members against displacement by pressure so that said outer edges provide sealing with said coaxial surface and wherein one of said coaxial surface and said outer edges have the helical sealing channels formed therein.

10. Apparatus of claims 1 or 2 in which said surface carrying said plurality of helical sealing channels is the coaxial surface of the stationary element.

11. Apparatus of claims 1 or 2 in which said surface carrying said plurality of helical sealing channels is said surface of the rotatable element.

12. Apparatus for processing materials which comprises:
   a rotatable element having a surface carrying at least one processing channel including opposed channel side walls;
   a stationary element providing a coaxial surface spaced apart from said surface of the rotatable element by a close clearance and cooperatively arranged with the processing channel to form an enclosed annular processing passage; said stationary element also having associated with it an inlet for feeding material to the passage, an outlet spaced apart from the inlet for discharging material from the passage and a member located in the channel providing a surface for restraining movement of the main body of material in the passage so that on rotation of said rotatable element in a direction from the inlet toward the material restraining surface, the rotatable element and the restraining surface providing member coact so that material in contact with the channel side walls is dragged toward the restraining surface and pressure increases along the length of travel of the channel side walls towards the restraining surface and,
   dynamic sealing means for preventing leakage of the pressurized material past said clearance including a plurality of helical sealing channels carried by one of said surfaces, arranged so that said liquid material can penetrate said sealing channels, the width of said one surface, the number, angle and geometry of said sealing channels being selected so that the outward penetration of said clearance and said sealing channels by the pressurized liquid is opposed by the inward force applied to the liquid in the sealing channels as the surfaces are relatively rotated to resist the extent of outward penetration of pressurized liquid in any of said sealing channels and, scraping means positioned near said inlet extending into said clearance and transversely between the width of the surfaces cooperating to provide the seal so that said scraping means is adapted to scrape off enough liquid accumulated between the sealing surfaces to break liquid contact between the surfaces at said positioned scraping means during each revolution of said rotatable element.

13. Apparatus of claim 12 where the width of said one surface, the number, angle and geometry of said sealing channels are selected so that the outward penetration of said clearance and said sealing channels by the pressurized liquid is opposed by the inward force applied to the liquid in the sealing channels as the surfaces are relatively rotated to resist the extent of outward penetration of pressurized liquid in any of said sealing channels.

14. Apparatus for processing materials which comprises:
   a rotatable element having a surface carrying a plurality of processing channels including opposed channel side walls;
   a stationary element providing a coaxial surface spaced apart from said surface of the rotatable element by a close clearance and cooperatively arranged with the processing channel to form an enclosed annular processing passage; said stationary element also having associated with it an inlet for feeding material to the passage, an outlet spaced apart from the inlet for discharging material from the passage and a member located in the channel providing a surface for restraining movement of the main body of material in the passage so that on rotation of said rotatable element in a direction from the inlet toward the material restraining surface, the rotatable element and the restraining surface providing member coact so that material in contact with the channel side walls is dragged toward the restraining surface and pressure increases along the length of travel of the channel side walls towards the restraining surface and,
   dynamic sealing means for preventing leakage of the pressurized material past said clearance including a plurality of helical sealing channels carried by said process channel carrying surface of said rotatable element and arranged so that said liquid material can penetrate said sealing channels, the width of said surface carrying said sealing channels, the number, angle and geometry of said sealing channels being selected so that the outward penetration of said clearance and said sealing channels by the pressurized liquid is opposed by the inward force applied to the liquid in the sealing channels as the surfaces are relatively rotated to resist the extent of outward penetration of pressurized liquid in any of said sealing channels and, scraping means positioned near said inlet extending into said clearance and transversely between the width of the surfaces cooperating to provide the sealing so that said scraping means is adapted to scrape off enough liquid accumulated between the sealing surfaces to break liquid contact between the surfaces at said positioned scraping means during each revolution of said rotatable element.

15. Apparatus of claims 12 or 13 or 14 in which said two surfaces are spaced apart from each other by a clearance which is about 10 mils or less.

16. Apparatus of claims 12 or 13 or 14 in which said two surfaces are spaced apart from each other by a clearance which is about 5 mils or less.

17. Apparatus of claims 12 or 13 or 14 in which said plurality of helical sealing channels are arranged substantially parallel to one another.

18. Apparatus of claims 12 or 13 or 14 in which the helix angle of each of said plurality of helical sealing channels is about 20° or less.

19. Apparatus of claims 12 or 13 or 14 in which the helix angle of each of said plurality of helical sealing channels is about 15° or less.

20. Apparatus of claims 12 or 13 or 14 in which the dynamic sealing means includes nested truncated conical members of stiffly resilient material, said members having a surface adjacent the outer edges arranged closest to the portion of the apparatus containing the pressurized liquid so as to be displaceable by pressure, and means for holding the inner edges of the members against displacement by pressure so that said outer edges provide sealing with said coaxial surface and wherein one of said coaxial surface and said outer edges have the helical sealing channels formed therein.

* * * * *